CHARACTER RECOGNITION APPARATUS

Filed Dec. 21, 1959 3 Sheets-Sheet 1

INVENTOR
PHILIP H. HOWARD
BY Paul M. Bronnew
AGENT

Dec. 8, 1964 P. H. HOWARD 3,160,853

CHARACTER RECOGNITION APPARATUS

Filed Dec. 21, 1959 3 Sheets-Sheet 2

3,160,853
Patented Dec. 8, 1964

3,160,853

CHARACTER RECOGNITION APPARATUS

Philip H. Howard, Apalachin, N.Y., assignor to International Business Machines Corporation, New York, N.Y., a corporation of New York Filed Dec. 21, 1959, Ser. No. 861,017
9 Claims. (Cl. 340—146.3)

This invention relates to character recognition apparatus and more specifically to apparatus for determining the duration of information bearing signals produced upon the scanning of an energized character bearing surface.

Numerous types of character recognition systems have been disclosed including both single channel and multichannel systems, and digital and analog type systems. The present invention is particularly adaptable to the system employing, in a plurality of channels, means for linearly scanning a character to be recognized and setting up in a storage matrix, by means of the multichannel signals, a representation of a character scanned by the multichannel scanning means, and employing means for recognizing the character representation set up in the storage matrix. Apparatus of this type is disclosed in the patent application of Eckelman, Hennis and Larson, Serial No. 804,996, filed April 8, 1959.

The present invention represents an improvement over the invention disclosed in the above-mentioned patent application and relates to the portion of the system disclosed therein in which the signals in each channel of the multichannel systems are analyzed to determine whether or not the signals are representative of "black" or "white" areas on the character bearing surface being scanned.

When the character forming areas are energized magnetic areas and the scanning means is magnetic scanning means, variations in the magnetic head output signal result from loss of contact between the heads and the document. Such out of contact conditions occur due to creases or folds in the document, embossing of the printing of the document, bounce or chatter between the pressure pad and the read head. Variations in output signal intensity are produced by variations in ink density and variations in character energization amplitude. While these problems can be partially overcome by increasing pressure between the document and the read head by means of loaded back up devices, this expedient results in excessive head wear and serves to only partially overcome the problems involved.

In certain types of character recognition systems, it is essential that the time duration of information bearing signals be employed to provide accurate representation of the length of the character forming area producing the signal. Variations in signal amplitudes as well as other considerations which will be hereinafter described have a very substantial influence on the apparent length of information bearing signals.

It is accordingly the primary object of this invention to provide apparatus responsive to the output signal of character scanning means for providing signals which are accurate representations of the length of the character increment scanned by the scanning means.

It has been observed that as a document carrying energized magnetic characters is moved out of contact with magnetic scanning means, the high frequency components of the resulting signal are the first to disappear, therefore it is necessary to devise a signal duration indication apparatus that minimizes the need for high frequency signals in the output of the scanning means.

It is thus a further object of the invention to provide a signal duration indicating apparatus that is substantially insensitive to high frequency signals.

When characters to be read are printed in ink, there are inevitably involved certain printing tolerances which must be granted to the printers for the production of printed documents at reasonable costs. These tolerances give rise to unwanted signals and to voids in desired signals as well as to deviations in the apparent locations of character edges. These conditions, resulting from normal printing tolerances, can affect the scanning means output analyzing apparatus to produce undesirable variations in matrix patterns produced thereby adversely affecting the operation of the recognition logic by which the characters represented in the matrix are recognized as the characters scanned. Characters otherwise presented such as for example for optical scanning present similar nonuniformities to the scanning means.

It is the principal object of this invention to provide means which will operate to produce signals giving accurate indications of the time duration of character forming areas scanned by scanning means and at the same time to provide apparatus which is relatively insensitive to spurious peaks in the output signals as well as to gaps in the signal.

The foregoing and other objects, features and advantages of the invention will be apparent from the following more particular description of a preferred embodiment of the invention, as illustrated in the accompanying drawings.

The various elements involved in the embodiment of the invention disclosed herein will first be described in a general manner in connection with FIGURE 1 in which there is shown those components which are old, having been previously disclosed in the above-mentioned patent application, and those components which are new and are more fully disclosed herein as representing an improvement over the above-mentioned patent application.

Figure 1:
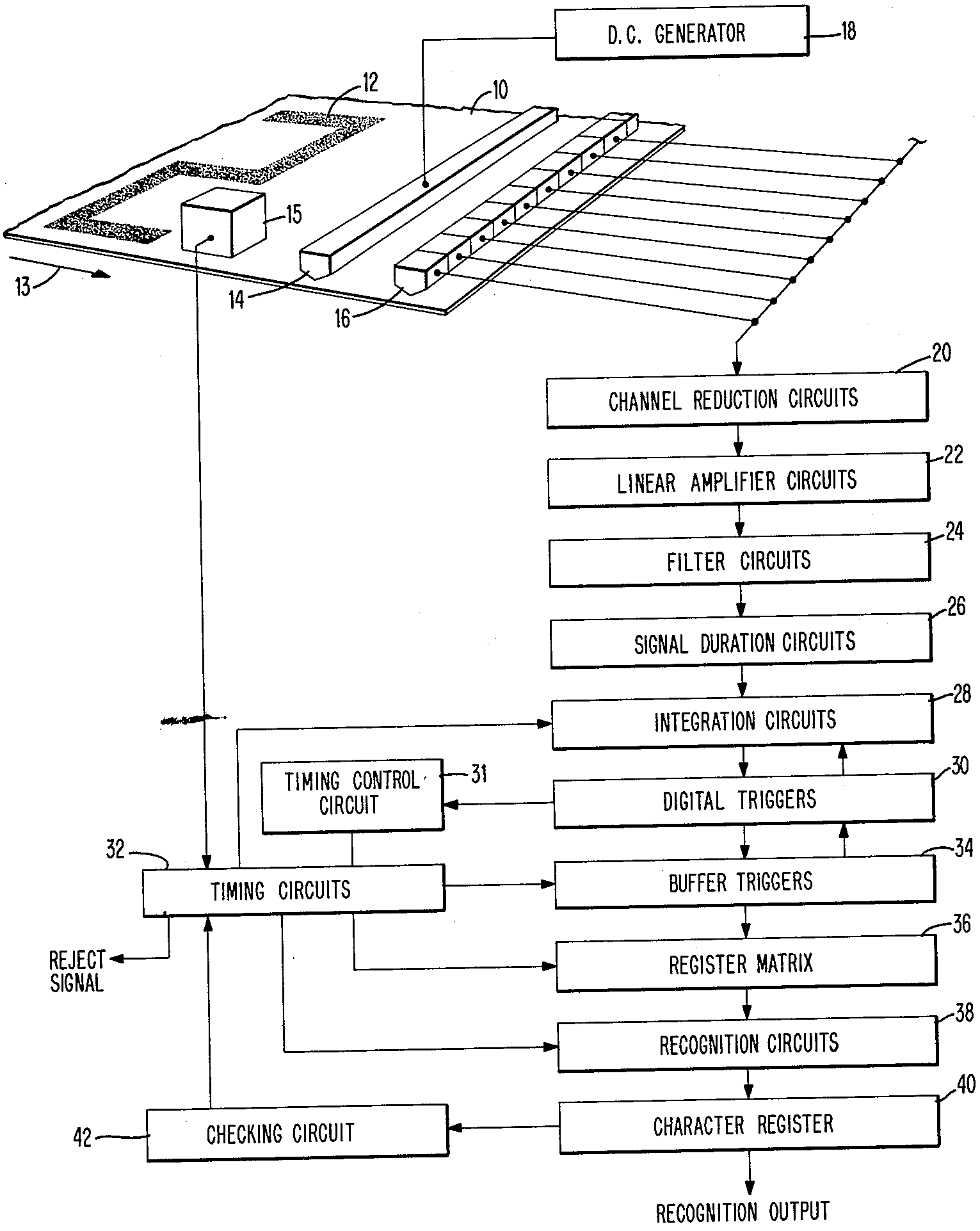
FIGURE 1 is a block diagram showing the various component parts of the embodiment of the invention disclosed herein.

In FIGURE 1, there is shown at 10, a fragmentary portion of a document or other surface forming means carrying indicia 12. The indicia shown is in the form of the numeric character "2." The character is printed by means of magnetic ink and is adapted to be sensed by magnetic scanning means.

The document 10 is advanced in the direction of the arrow 13 by conventional transport means and the character 12 is carried past magnetic write and read heads 14 and 16, respectively, positioned to scan the character as it passes thereby.

The write head 14 is powered from a D.C. source 18 and thus operates to magnetically polarize the magnetic material in the ink forming the indicia 12.

The read head 16 is actually a plurality of read heads positioned adjacent to one another to provide multichannel scanning of characters passing thereunder. It is desirable to provide write and read heads of sufficient length with respect to the vertical height of the character to be read to insure scanning of the entire height of each character even though successive groups of characters may be displaced vertically with respect to each other or printed on various horizontal lines. Accordingly, a single extended write head is used and, in conjunction therewith, a read head is employed having, in the arrangement described, a number of heads which is an even multiple of the minimum number of heads desirably employed to fully scan a single character. Outputs from the multichannel read head 16 are delivered to channel reduction circuits 20.

In the embodiment of the invention described herein, the channel reduction circuits receive outputs from twenty magnetic heads in the read head 16 and reduce these to ten channels for subsequent manipulation. The ten channels represent a sufficient length of the read head 16 to insure the multichannel scanning of the entire height of a character 12.

While various types of character printing, character energizing and character scanning means may be employed, for certain purposes magnetic printing, magnetic energizing and magnetic scanning are preferred. Regardless, however, of the particular arrangement employed, the essential objective is the production of signals on each of the ten channels representing horizontal scanning through a character to be recognized. It will also be evident that the selection of ten channels is arbitrary depending upon the configuration of the characters to be identified as well as the total number of characters to be recognized.

As shown in FIGURE 1, each of the ten channels forming the output from the channel reduction circuits 20, is delivered to a corresponding plurality of amplifier circuits 22. These amplifiers are linear amplifiers. The outputs of the amplifier circuits 22 are delivered to filter circuits 24. These circuits are band pass filters passing, for example, frequencies from one thousand cycles to 20 kc. The linear amplifier circuits 22 are linear within this band range. Circuits of these types are well known and may in fact be combined in one unit by means of circuitry well known in the art.

The outputs of the filter circuits 24 are delivered to signal duration circuits 26 which represent the essential elements of novelty in this invention and will be hereinafter described in greater detail in connection with FIGURES 2–5. At this time it is sufficient to note that the output of the signal duration circuits is provided by a trigger which indicates whether at any given interval, the input signals received from the read head elements are indicating "black" or "white," i.e., indicating whether or not the signals received are information bearing signals.

The outputs of the signal duration circuits 26 are delivered to integration circuits 28. The integration circuits and all of the circuits shown thereafter in FIGURE 1 have been fully set forth in the above-mentioned patent application and need not be described in detail herein.

The integration circuits 28 function to provide for successive integrations when a "black" indicating signal exists through a plurality of integration time intervals. The time intervals are determined by operation of a timing circuit 32.

The outputs of the integration circuits are delivered to digital triggers 30 after each of the integration time intervals. One trigger is provided for each of the ten channels and the digital trigger in each channel is turned on whenever integration in that channel has proceeded to a threshold value. Upon turning on of a digital trigger, its integration circuit is reset in preparation for a next successive integration cycle.

Each of the ten digital triggers 30 when on, is employed to turn on a respective buffer trigger 34 in its channel. The turning on of the buffer trigger is controlled in the following manner.

Outputs of the digital triggers 30 are delivered to a timing control circuit 31 which acts when at least two digital triggers are on simultaneously to initiate operation of a timing circuit 32. It is considered, when two digital triggers have been turned on by "black" indications in their respective channels, that this is sufficient evidence of the arrival of a character to be recognized, and the operation of the timing circuit 32 may then be initiated. Operation of the timing circuit serves to define character increments and to control the operation of the integration circuits 28, the digital triggers 30, the buffer triggers 34, as well as the register matrix 36 and the recognition circuits 38 as will be hereinafter described.

The timing circuits control the transfer of information from the integration circuits 28 successively through the digital triggers 30 and the buffer triggers 34 to successive columns of registers in the register matrix 36 during each successive character increment. At the end of the character scanning interval, this control will have provided in the register matrix, a representation of the character scanned.

At the completion of the character time, the register elements of the register matrix 36 are interrogated by recognition circuits 38 and the outputs of the recognition circuits are delivered to a character register 40. The register is conveniently in the form of triggers, one representing each of the characters possibly recognized by the recognition circuits. The outputs of the character register triggers are delivered to any desired utilization apparatus and are also delivered to a checking circuit 42 which checks to confirm the recognition of one character and not more than one character, and generates in conjunction with the timing circuit 32, a reject signal if less than one character or more than one character has been recognized.

In FIGURE 1, there is also provided, as indicated at 15, means for sensing the leading edge of a character bearing surface, such as a card, sheet, or other document forming means. The document sensing means 15 serves to provide an output pulse in response to the leading edge of a document and this pulse is employed to insure proper settings of various components of the circuitry prior to the commencement of a character reading cycle.

From the foregoing, it will be evident that character recognition apparatus of this type requires circuitry capable of accurately locating the character front in order that the timing apparatus will produce character incremental time intervals properly coincident with the character being scanned.

Furthermore, the apparatus must provide accurate quantizing of character line lengths in order that both the character front and the length of a character line in one horizontal channel through the character, as produced by the multichannel sensing means, will be accurately measured for transmission to the character matrix.

A third consideration is that the out-of-contact signal must be interpreted with the same accuracy of response as the in-contact signal.

When the characters being scanned have been energized by means of the D.C. source and the polarized magnetic ink passes under a read head, the head will produce a $d\phi/dt$ output in the form of a positive pulse in response to the leading edge of a character line and a negative pulse in response to the trailing edge of a character line. The slope of the pulse is a function of the amplitude of the character energization and the distance between the reading head and the magnetic ink, and is thus affected substantially by any out-of-contact condition between the reading head and the surface of the document carrying the printed indicia and also by the density and magnetic characteristics of the ink forming the character being scanned. High frequency components of the output are attenuated more than low frequency components as the out-of-contact distance is increased.

The amplitude of the pulse is a function of the energization signal level which is substantially uniform, the ink density which may vary substantially and the out-of-contact condition if any exists.

The signal duration circuits indicated at 26 in FIGURE 1, must be capable of responding to a wide range of pulse shapes, i.e., pulse slope and amplitude conditions and to produce in response to these pulses accurate indications of the length of the character forming lines producing the signal.

An accurate indication of line length is obtained by measuring the time between the positive and negative peaks of the $d\phi/dt$ signal received from the read head, delaying this measurement and combining the delayed measurement with the output of a circuit integrating the $d\phi/dt$ signal.

The presence of magnetic ink is indicated whenever the integrator level exceeds a fixed threshold value. However, due to the wide range of pulse shapes appearing in the $d\phi/dt$ signal, the period of time that the integration output exceeds the threshold value is not an accurate indication of character line length.

As will be described in greater detail, the integration portion of the device alone is not adequate as a signal duration indicator because it does not give an accurate measure of time. On the other hand, the peak detector alone is not adequate because spurious signal pulses and voids frequently occur during the reading of a character line and these would give rise to indications of unwanted short lines and to long lines as being a multiplicity of shorter lines. However, both of these circuits acting together are capable of giving an accurate indication of the presence and time duration of a character line.

Figure 2:
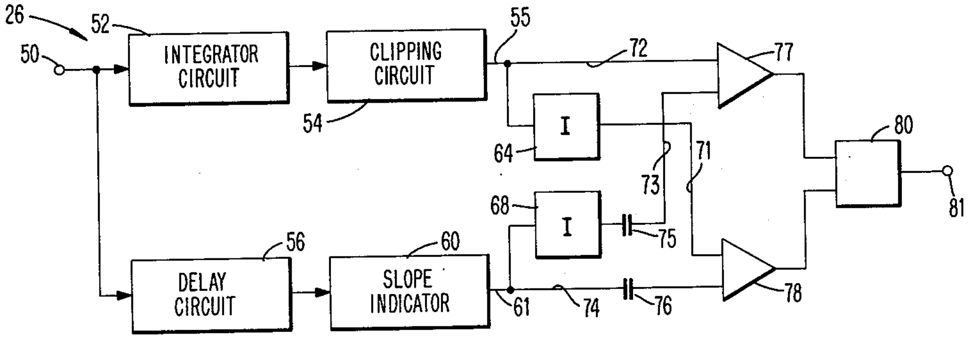
FIGURE 2 is a block diagram showing in greater detail one of the component parts shown in FIGURE 1 which includes an integration circuit and a clipping circuit.

In FIGURE 2, there is indicated generally at 26, the signal duration indicating circuitry employed in one of the ten channels of the signal duration circuits shown at 26 in FIGURE 1.

The input to this circuit at terminal 50 is taken from the output of the amplifier and filter circuits in FIGURE 1. These signals are $d\phi/dt$ pulses which have been filtered by the 1-to-20 kc. band filter. This input is delivered to an integrator circuit 52, the output of which is delivered to a clipping circuit 54. These two circuits will be hereinafter described in detail in connection with FIGURE 3.

Figure 5:
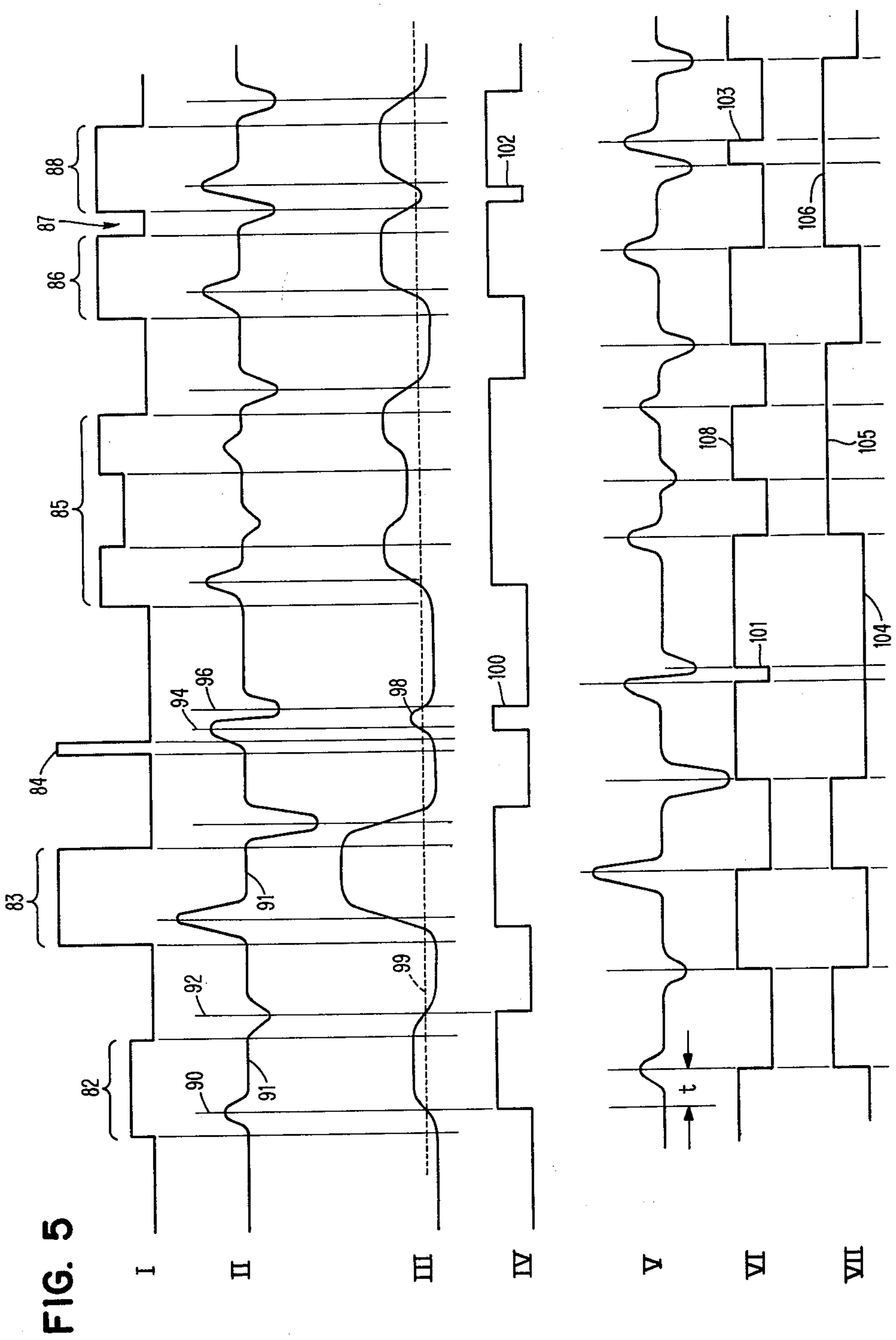
FIGURE 5 is a timing diagram showing waveforms appearing at various locations in the apparatus during reading of a character.

At this time, however, it is noted that the input signal at terminal 50 is indicated on line II of FIGURE 5. On line I of FIGURE 5, there is represented, as a square wave signal, ink densities to which the scanning head is responding to produce the signals appearing on line II. The various portions of these signals will be hereinafter described. At this time, however, it should be noted that line III represents the outputs of the integrator circuit 52 which is delivered to the clipping circuit 54. The clipping level is indicated at 99 in line III. Line IV shows the idealized square wave signal produced by the clipping circuit 54 of FIGURE 2 in response to the output of the integrator shown on line III of FIGURE 5.

Figure 4:
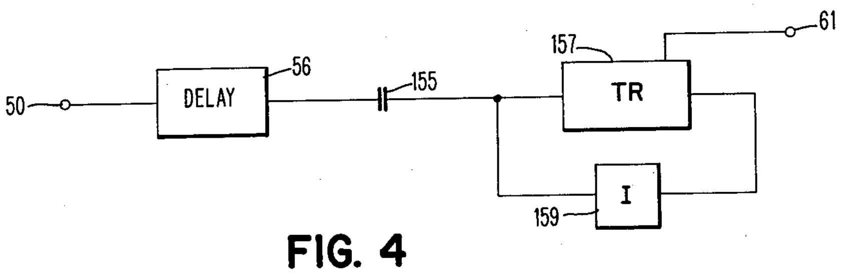
FIGURE 4 is a circuit diagram of the delay and slope indicating circuits shown in FIGURE 2.

In FIGURE 2, there is also shown a delay circuit 56 which receives the input taken at terminal 50 and serves to delay this input and then deliver the delayed signal to a slope indicator 60. The delay circuit is conventional and well known to those skilled in the art and thus need not be described in detail herein. The details of one form of slope indicator are shown in FIGURE 4 and will be described later. In FIGURE 5, the line VI shows the output of the slope indicator in response to a delayed input wave which is shown on line V, this wave being identical to the wave shown in line II except for the delay time $t$.

The integration output on line 55 in FIGURE 2, is delivered to one input of a two-input AND circuit 77 via line 72 and delivered through an inverter 64 and line 71 to one input of a two-input AND circuit 78.

The output of the slope indicator 60, on line 61, is delivered via a capacitor 76 and line 74 to the other input of AND circuit 78 and through an inverter 68, capacitor 75 and line 73 to the other input of AND circuit 77.

The outputs of the AND circuits 77 and 78 provide the on-side and off-side inputs respectively to a trigger 80 which forms the signal duration trigger. The off-side output of trigger 80 indicates the presence of a "white" or the absence of a character indicating signal. Thus, the output at terminal 81 is a square wave output with the signal down when the "white" areas are being read by the scanning means and up when "black" areas are being read.

The output is equivalent to the output signal described in the above-mentioned patent application and shown therein in FIGURE 2*a* on line V. This signal is delivered to the integration circuit described therein and indicated in the present application at 28 in FIGURE 1.

The functioning of the circuits of FIGURE 2 can best be understood by examination of the signals shown in FIGURE 5. As has been previously described, the waveform shown on line I of FIGURE 5 represents ink patterns where the amplitude of the waveform is representative of ink density and the horizontal length of the pulses shown is proportional to the time that the ink is under the sensing head. The pulse indicated at 82 is a pulse of normal amplitude and normal duration. The pulse indicated at 83 is of high amplitude and normal duration. The pulse indicated at 84 is high amplitude and short duration. The pulse indicated at 85 is of normal amplitude and long duration but varies in amplitude during the central portion thereof resulting from either embossing of the ink into the document during printing or to squeezing out of ink whereby excessive quantities of ink exist at the edge of the character and relatively less ink exists in the central region of the printing. The patterns indicated at 86 and 88 are of approximately normal time duration and amplitude separated by a small gap 87 indicating a void in the printed area 86–88.

The waveform of line II shows the filtered $d\phi/dt$ pulse output from the magnetic sensing head which has scanned the ink pattern shown in line I. This waveform is the input to the signal duration indicator circuits previously described. It is important to note that the distance between the positive and negative peaks of this waveform is equal to the distance between the beginning and the end of the respective ink patterns of the waveforms of line I when the time duration of the ink pattern is sufficiently long to provide a region of linear signal 91 in line II. Thus, for example, the pulses resulting from the ink pattern 82 are spaced apart by a time equal to the time duration of the ink pattern 82, whereas, the pulses resulting from ink pattern 84, are spaced apart by a time duration substantially greater than the time duration of the ink pattern 84.

The minimum distance between the positive and negative peaks is determined by the upper cut-off frequency of the filter circuit previously described. The amplitude of the filter signals is attenuated for short duration ink patterns such as 84.

The waveform on line III represents the output of the integrator circuit which is responsive to the waveform of line II. While the area under each integrator pulse is proportional to the area of the respective ink pattern, the amplitude of the integrator pulse 98 is greatly reduced because of the short time duration of the ink pattern 84.

It should be noted that the magnetic sensing device is a differentiator and therefore the integration process should produce the original waveform except for a constant. However, departure from ideal reconstruction of the first waveform is due to the action of the filter circuit 24. Some filtering results from the fact that the head is out of contact with the document and this filtering cannot be eliminated. The filter circuit 24 shown in FIGURE 1 makes it possible to treat all signals as though they were sensed out of contact and the signal duration apparatus can asume that there are no high frequency components in the signal.

The waveform of line IV is the output signal from the clipper circuit. It is derived from the waveform of line III by setting a threshold level as is indicated by the dotted line 99. The output of the clipper circuit is positive, if, and only if, the integrator output level exceeds the threshold level. This function can be accomplished with a high gain saturating amplifier operating about a threshold. The output of the clipper is shown on line IV in which the positive and negative-going pulses of the signal are in time coincidence with the intersection of the threshold line 99 with the output of the integrator.

The waveform of line V represents the output of the delay circuit 56 shown in FIGURE 2 and is a waveform identical to that shown in line II except for the delay time $t$.

The waveform of line VI indicates the output of the slope indicator 60 which is responsive to the waveform of line V. The slope indicator comprises a trigger circuit which provides an output signal whenever the derivative of the input signal goes positive and is turned off whenever the derivative of the input signal goes negative. The state of the trigger is not changed by having the derivative rest at zero.

It should be noted that the relative serial positions of the delay circuit 56 and the slope indicator circuit 60 can be interchanged. This reversed arrangement is advantageous in that the output signals from the slope indicator are at lower frequencies than the scanning signals, and hence the bandpass requirements of the delay circuit are lessened.

The waveform on line VII represents the on or off condition of the signal duration trigger 80. Its status is derived from the waveforms of line IV and line VI. The signal duration trigger is turned on when the slope indicator goes negative if the clipper output is positive. The signal duration trigger is turned off when the slope indicator goes positive while the clipper output is negative.

The delay time $t$ and the control asserted by the waveforms of line IV and VI on the signal duration trigger as indicated on line VII produces, with two exceptions, a trigger output, having time intervals corresponding to the ink patterns shown in line I. The two exceptions are the short time duration ink pattern 84 in line I and the short time duration ink void indicated at 87 in line I. The ink pattern 84 provides the pulse 100 on line IV and the pulse 101 on line VI. The time delay $t$ shown on line V is such as to displace these two pulses completely out of coincidence and thus their existence in their respective waveforms does not influence the operation of the signal duration trigger as shown at 104 on line VII. Similarly, the void shown at 87 in line I produces pulses 102 and 103 in waveforms IV and V respectively and these pulses are also sufficiently displaced so as to be completely out of coincidence and thus do not affect the operation of the signal duration trigger as shown at 106 in line VII.

Thus, the employment of the two signals, i.e., the output of the clipper circuit shown on line IV and the output of the delayed slope detector shown on line VI, acting in combination, provide an accurate measure of time while at the same time eliminating spurious peaks and gaps in the input signal.

A further function of the circuit is the elimination of pulses such as that indicated at 108 in line VI resulting from variations in ink density as indicated at 85 in line I. The slope detector circuit responds to these variations whereas the clipper circuit does not and thus the combination of the two provides for an uninterrupted output of the signal duration trigger, as shown at 105 on line VIII.

Figure 3:
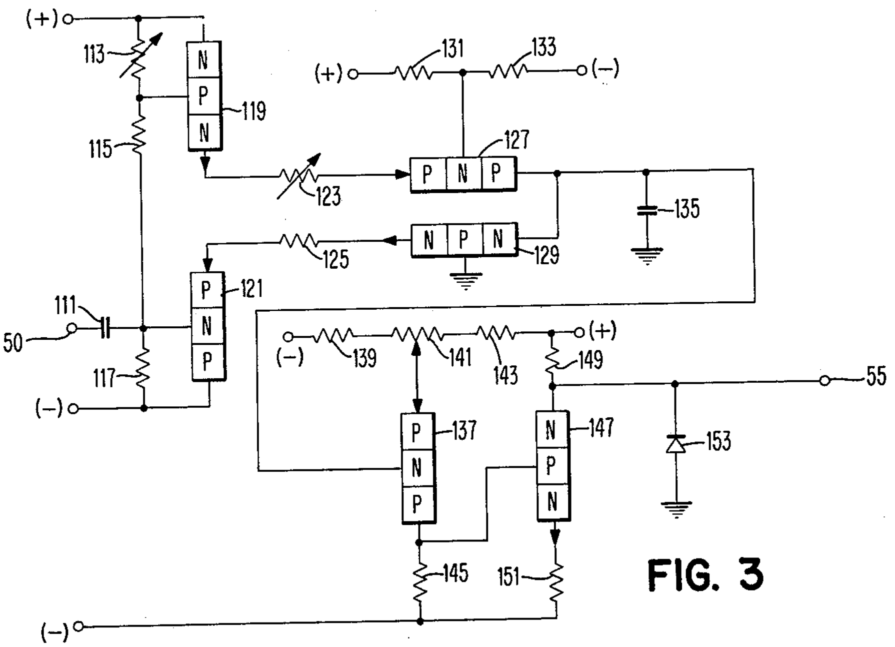
FIGURE 3 is a circuit diagram of the integration and clipping circuits shown in FIGURE 2.

The integrator circuit 52 and the clipping circuit 54 indicated in FIGURE 2 are shown in detail in FIGURE 3.

Referring to FIGURE 3, the signals at terminal 50 are supplied via a capacitor 111 to a voltage divider comprising resistors 113, 115 and 117 connected in series across a source of direct current, not shown, the terminals of which are designated as (+) and (−). From the voltage divider, inputs are provided to a pair of emitter followers including transistors 119 and 121. The emitters of these transistors are connected via resistors 123 and 125 to the emitters of two transistors 127 and 129, which are operating as grounded-base circuits, the base of transistor 127 being connected to a reduced source of positive potential afforded by the voltage divider comprising resistors 131 and 133, and the base of transistor 129 being connected to ground. The collectors of transistors 127 and 129 are connected to one side of integrating capacitor 135, the other side of which is grounded. In operation, positive-going signals are supplied via emitter follower 119 and transistor 127, which function as a constant current device to capacitor 135, so that the change on capacitor 135 and hence the voltages thereacross are proportional to the time-amplitude integral of the input signal. Negative-going signals cause the capacitor to be discharged via transistors 121 and 129, the latter also acting as a constant-current device. By use of the constant-current devices in the charging and discharging circuits, the linearity of the operation is improved.

The integrated output voltages are supplied to a clipping circuit including transistors 137 and 147. The output of the integrator is connected to the base of transistor 137, the emitter of which is maintained near ground potential by the voltage divider including resistors 139, 141 and 143. The collector is connected via resistor 145 to (−), and the collector is also directly connected to the base of transistor 147, the collector of which is connected to (+) via resistor 149, and the emitter of which is connected to (−) via resistor 151. A clamping diode 153 clamps the collector of transistor 147 to a specified value such as ground, and the collector also furnishes the clipped output to terminal 55. This combination serves as a high gain saturated amplifier, so that inputs thereto must exceed a predetermined value, set by adjustment of resistor 141, before an output signal is supplied at terminal 55. These output signals will have a constant amplitude as shown in line IV of FIGURE 5. Other forms of circuitry may be employed for the integrating and clipping circuits and the arrangement disclosed is exemplary only.

FIGURE 4 illustrates in detail an arrangement which may be employed as a slope indicator. Delay unit 56 is conventional, and may be, for example, a lumped or a distributed constant electromagnetic delay line, well known in the art. The output of delay device 56 is coupled via a capacitor 155 to one input side of a trigger circuit 157, and to the other input side of trigger 157 via an inverter 159. Output from the trigger is supplied to line 61, as shown in FIGURE 2.

The trigger is presumed to be of the type in which positive-going pulses supplied to the respective inputs will cause the trigger to change state, but successive positive pulses applied to an input circuit will not cause a change of stage, nor will negative-going pulses have any effect on the trigger.

In operation the incoming pulses from the filter are delayed by delay unit or circuit 56 and are differentiated by the capacitor 155. Positive-going pulses from the delay circuit, when differentiated, provide a positive-going pulse followed by a negative-going pulse, whereas a negative-going pulse from the delay circuit, when differentiated, provides a negative-going pulse followed by a positive-going pulse. The positive-going pulses supplied from capacitor 155 to the left-hand input of trigger 157 will hold the trigger on, or set it to its on state if off. These same pulses are inverted by inverter 159 and supplied to the right-hand input of trigger 157, but, as previously pointed out, negative-going pulses will not operate the trigger. On the other hand, negative-going differentiated pulses supplied from capacitor 155 directly to the left-hand input of trigger 157 will have no effect, but these same pulses, inverted by inverter 159 and supplied to the right-hand input of trigger 157, will turn the trigger off, or keep it off if already in that state.

Leading character-edge pulses will produce a positive-going scanning signal, as shown in FIGURE 5. This signal when delayed and differentiated will therefore turn the trigger 157 on. Trailing edge signals, when differentiated, will turn trigger 157 off.

The output from the trigger, as it changes state, is supplied as previously described to the AND circuit 77 and 78 where the combination governs the signal duration trigger.

As previously explained in connection with the integrator and clipping circuits, the actual form of the slope indicator is immaterial, and the disclosed arrangement is exemplary.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Character recognition apparatus comprising multichannel scanning means for scanning characters and producing a scanning signal in response thereto, quantizing means for each of said channels for determining whether successive increments of said scanning signal are indicative of scanned character-forming means, and means responsive to said quantizing means for identifying a character scanned, each of said quantizing means including means for filtering from said scanning signal frequencies above a predetermined upper cut-off value, integrating and clipping means responsive to said filtered signal for producing a first output signal when and only when the amplitude-time integral of said filtered signal exceeds a predetermined amplitude, means responsive to beginning and ending portions of said filtered signal for producing a delayed second output signal indicative of the duration of said signal, and means responsive to said first and said second output signals for signaling the scanning of a character-forming area.

2. Character recognition apparatus comprising multichannel scanning means for scanning magnetic characters and producing a scanning signal in response thereto, quantizing means for each of said channels for determining whether successive increments of said scanning signal are indicative of scanned character-forming means, and means responsive to said quantizing means for identifying a character scanned, each of said quantizing means including means for filtering from said scanning signal frequencies above a predetermined upper cut-off value, integrating and clipping means responsive to said filtered signal for producing a first output signal when and only when the amplitude-time integral of said filtered signal exceeds a predetermined amplitude, means responsive to beginning and ending portions of said filtered signal for producing a delayed second output signal indicative of the duration of said signal, and means responsive to said first and said second output signals for signaling the scanning of a character-forming area.

3. Character recognition apparatus comprising multichannel scanning means for scanning polarized magnetizable characters and producing output signals in response thereto, filter means, one for each channel, connected to said scanning means and effective to pass said scanning signal components below a predetermined upper frequency cut-off value, quantizing means one for each channel, connected to said filter means for determining whether successive increments of said filtered signal in each channel are indicative of scanned character-forming areas, and analyzing means connected to said quantizing means for identifying characters scanned, said quantizing means including integrating means in each channel responsive to said filtered signal for producing a first output indicative of the amplitude-time integral of said filtered signal, delay differentiator means for each channel connected to said filter means for providing a delayed second output signal indicative of the beginning and ending of each character-forming area, and logic circuit means for each channel connected to said integrating means and said delay differentiator means and effective to combine said first and said second signals to supply an output signal when said filtered signal begins and terminates with predetermined values of said amplitude-time integral.

4. Character recognition apparatus comprising multichannel scanning means for scanning polarized magnetizable characters and producing output signals in response thereto, filter means, one for each channel, connected to said scanning means and effective to pass said scanning signal components below a predetermined upper frequency cut-off value, quantizing means, one for each channel, connected to said filter means for determining whether successive increments of said filtered signals in each channel are indicative of scanned character-forming areas, and analyzing means connected to said quantizing means for identifying characters scanned, said quantizing means including integrating and limiting means, one for each channel, connected to said filter means and responsive to said filtered signal for supplying therefrom a first output signal indicative of the portion of the amplitude-time integral of said filtered signal exceeding a predetermined threshold value, delay differentiator means, one for each channel, connected to said filter means for providing a delayed second output signal indicative of the beginning and the ending of each character-forming area, and logic circuit means governed by said integrating and limiting means and by said delay differentiator means for providing a signal output between the times that said second signal from said delay differentiator indicates the onset of a character-forming area, provided there is a first output signal from said integrating and clipping means, and the time that said second signal from said delay differentiator means indicates the leaving of a character-forming area, provided there is no first output signal from said integrating and clipping means.

5. Character recognition apparatus comprising multichannel scanning means for scanning magnetically polarized characters and producing output signals in response thereto, filter means, one for each channel, connected to said scanning means and effective to pass said scanning signal components below a predetermined upper frequency cut-off value, quantizing means, one for each channel, connected to said filter means for determining whether successive increments of said filtered signals in each channel are indicative of scanned character-forming areas, and analyzing means connected to said quantizing means for identifying characters scanned, said quantizing means including integrating and limiting means, one for each channel, connected to said filter means, and responsive to said filtered signal for supplying therefrom a first output signal indicative of the portion of the amplitude-time integral of said filtered signal exceeding a predetermined threshold value, a delay means and a differentiating means, one for each channel, connected to said filter means and effective to provide a delayed and differentiated second signal in response to said filtered signals, the delay time being in excess of the duration of permissible low density areas in said character-forming areas, and logic circuit means governed by said integrating and limiting means and by said delay differentiator means for providing a signal output between the times that said second signal from said delay differentiator indicates the onset of a character-forming area, provided there is a first output signal from said integrating and clipping means, and the time that said second signal from said delay differentiator means indicates the leaving of a character-forming area, provided there is no first output signal from said integrating and clipping means.

6. Character recognition apparatus comprising multichannel scanning means for scanning magnetically polarized characters and producing output signals in response thereto, filter means, one for each channel, connected to said scanning means and effective to pass said scanning signal components below a predetermined upper frequency cut-off value, quantizing means, one for each channel, connected to said filter means for determining whether successive increments of said filtered signals in each channel are indicative of scanned character-forming areas, and analyzing means connected to said quantizing means for identifying characters scanned, said quantizing means including integrating and limiting means, one for each channel, connected to said filter means, and responsive to said filtered signal for supplying therefrom a first output signal indicative of the portion of the ampiltude-time integral of said filtered signal exceeding a predetermined threshold value, a delay means and a differentiating means, one for each channel, connected to said filter means and effective to provide a delayed and differentiated second signal in response to said filtered signals, the delay time being in accordance with said upper frequency cut-off value, and logic circuit means governed by said integrating and limiting means and by said delay differentiator means for providing a signal output between the times that said second signal from said delay differentiator indicates the onset of a character-forming area, provided there is a first output signal from said integrating and clipping means, and the time that said second signal from said delay differentiator means indicates the leaving of a character-forming area, provided there is no first output signal from said integrating and clipping means.

7. Means for accurately indicating the duration of a time interval denoted by electrical pulses at the beginning and ending of the interval, comprising, in combination, integrating means for receiving said pulses and integrating the pulses, clipping means connected to said integrating means and effective to supply a first constant amplitude signal therefrom during the time that the output of said integrating means is greater than a predetermined threshold value, delay means connected to receive said pulses and to provide delayed pulses in accordance with the received pulses, differentiating means connected to said delay means and effective to provide a second slope indicating signal in accordance with the change of slope of said delayed pulses as the peak of the delay pulses occurs, and logic circuit means connected to said clipping means and said differentiating means and effective to provide an output beginning at the time of peak amplitude of the delayed beginning pulse, provided there is a first output signal from said clipping means, and ending at the time of peak amplitude of the delayed ending pulse, provided there is no first output signal from said clipping means.

8. Means for accurately indicating the duration of a time interval denoted by a beginning pulse having one polarity and an ending pulse of the opposite polarity, comprising, integrating means connected to receive said pulses and to provide an output signal proportional to the amplitude-time integral of said pulses, clipping circuit means connected to said integrating means and effective to provide a constant amplitude output signal during the interval in which the integrated output of said integrating means corresponding to said beginning pulse is greater than a predetermined threshold value, delay means connected to receive said beginning and ending pulses and effective to delay said pulses by a predetermined time interval, differentiator means connected to said delay means and effective to differentiate said delayed beginning and ending pulses, first logic circuit means connected to said clipping means and said differentiating means and providing a first output when said differentiating means provides a signal indicating the peak of said delayed beginning pulse and an output is supplied from said clipping means, second logic circuit means connected to said clipping circuit means and said differentiating means and providing a second output when said differentiating means provides a signal indicating the peak of said delayed ending pulse and no output is provided from said clipping circuit means, and output circuit means connected to said first and second logic circuit means.

9. An arrangement as claimed in claim 8, in which said output circuit means comprises a bistable device set to one condition by said first output and set to the other condition by said second output.

References Cited in the file of this patent

UNITED STATES PATENTS

| | | |
|---|---|---|
| 2,615,992 | Flory et al. | Oct. 28, 1952 |
| 2,963,683 | Demer et al. | Dec. 6, 1960 |

FOREIGN PATENTS

| | | |
|---|---|---|
| 1,174,001 | France | Mar. 5, 1959 |
| 785,853 | Great Britain | Nov. 6, 1957 |